(12) United States Patent
Borg

(10) Patent No.: US 8,035,654 B1
(45) Date of Patent: Oct. 11, 2011

(54) TUNING CELL SIZES IN INTERPOLATED LOOKUP TABLES

(75) Inventor: Lars U. Borg, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1087 days.

(21) Appl. No.: 11/840,851

(22) Filed: Aug. 17, 2007

(51) Int. Cl.
*G09F 5/02* (2006.01)

(52) U.S. Cl. ........ 345/600; 345/589; 345/596; 345/602; 345/604; 345/605; 345/606; 382/167; 382/169

(58) Field of Classification Search .................. None
See application file for complete search history.

(56) References Cited

U.S. PATENT DOCUMENTS

| | | | |
|---|---|---|---|
| 4,839,721 A | 6/1989 | Abdulwahab et al. | |
| 4,992,861 A | 2/1991 | D'Errico | |
| 5,057,913 A | 10/1991 | Nagata et al. | |
| 5,140,414 A | 8/1992 | Mowry | |
| 5,255,083 A | 10/1993 | Capitant et al. | |
| 5,457,491 A | 10/1995 | Mowry | |
| 5,641,596 A | 6/1997 | Gray et al. | |
| 5,841,512 A | 11/1998 | Goodhill | |
| 6,014,165 A | 1/2000 | McIntyre et al. | |
| 6,075,887 A | 6/2000 | Brett | |
| 6,671,000 B1 | 12/2003 | Cloutier | |
| 6,798,536 B1 * | 9/2004 | Muramoto | 358/1.9 |
| 6,826,303 B2 | 11/2004 | D'Souza et al. | |
| 6,864,915 B1 | 3/2005 | Guimares et al. | |
| 6,954,286 B1 | 10/2005 | Muramoto | |
| 6,985,253 B2 | 1/2006 | Figueroa et al. | |
| 6,987,586 B2 | 1/2006 | Bogdanowicz et al. | |
| 7,053,927 B2 | 5/2006 | Jones et al. | |
| 7,106,344 B2 | 9/2006 | D'Souza et al. | |
| 7,333,136 B2 | 2/2008 | Takemoto | |
| 7,411,697 B2 | 8/2008 | Kuno | |
| 7,710,607 B2 | 5/2010 | Ishii | |

(Continued)

FOREIGN PATENT DOCUMENTS

EP 1104175 5/2001

(Continued)

OTHER PUBLICATIONS

"Sensitometric and Image-Structure Data" Kodak Cinematography Student Filmmaker Program, http://www.kodak.com/US/en/motion/students/handbook/sensitometric.jhtml?id=0.1.4.9.6.10, 2 pages.

(Continued)

*Primary Examiner* — Antonio Caschera
(74) *Attorney, Agent, or Firm* — Robert C. Kowert; Meyertons, Hood, Kivlin, Kowert & Goetzel, P.C.

(57) ABSTRACT

Tuning sizes of cells of an interpolated lookup table may be performed based at least in part on an area specific behavior of a quality metric. A weighted input shaper curve may be determined to reduce interpolation errors in a multi-dimensional color lookup table. An initial input shaper curve may be applied to a color lookup table to create an interpolation result. The interpolation result may then be assessed for accuracy. The accuracy assessment may include comparing the interpolation result with a reference representation. An interpolation error may be calculated as the error between one or more intervals in a prospective color lookup table as compared to a reference representation. The weighted input shaper curve may be based at least in part on the calculated interpolation error.

29 Claims, 4 Drawing Sheets

U.S. PATENT DOCUMENTS

| | | | |
|---|---|---|---|
| 7,742,207 | B2 | 6/2010 | Usui et al. |
| 2005/0122536 | A1 | 6/2005 | Selan |
| 2006/0181721 | A1 | 8/2006 | Kulkarni |
| 2007/0189381 | A1 | 8/2007 | Borg |
| 2008/0158580 | A1 | 7/2008 | Okamoto |
| 2009/0310157 | A1 | 12/2009 | Wada |

FOREIGN PATENT DOCUMENTS

| | | |
|---|---|---|
| EP | 1237379 | 9/2002 |
| WO | WO 95/21502 | 8/1995 |
| WO | WO 00/26857 | 5/2000 |

OTHER PUBLICATIONS

Koren, "Color Management and Color Science: Introduction" www.normankoren.com/color_management.html, 11 pages, 2002-2004.

"Sensitometric and Image-Structure Data" Kodak Motion Picture Imaging, http://www.kodak.com/US/en/motion/support/h1/structureP.shtml, 15 pages.

"David Bourgin's Color spaces FAQ" www.scarse.org/docs/color_faq.html, 27 pages, Apr. 18, 1995.

"Kodak Vision Color Print Film/2383, 3383" Eastman Kodak Company, Pub. No. H-1-2383t, 8 pages, Mar. 2005.

"Photography—Density Measurements—Part 3: Spectral Conditions" www.iso.org, International Organization for Standardization, ISO 5-3:1995, 1 page, 1995.

"Spectral Conditions Defining Printing Density in Motion-Picture Negative and Intermediate Films", Society of Motion Picture and Television Engineers (SMPTE) RP 180-1999, www.smpte.org, 3 pages, 1999.

"SMPTE Standard for File Format for Digital Moving-Picture Exchange (DPX)", Version 2.0, Society of Motion Picture and Television Engineers (SMPTE), 268M-2003, www.smpte.org, 17 pages, May 5, 2003.

"Gray-Scale Transformations of Digital Film Data for Display, Conversion, and Film Recording", SMPTE Tutorial, SMPTE Journal, vol. 102, No. 12, pages 1109-1119, Dec. 1993.

International Color Consortium, Specification ICC.1:Oct. 2004, Image technology colour management—Architecture, profile format, and data structure, 111 pages, 2004.

International Color Consortium, Specification ICC.1:Sep. 2003, File Format for Color Profiles, Version 4.1.0, 121 pages, 2003.

"Grayscale Transformations of Cineon Digital Film Data for Display, Conversion, and Film Recording" Version 1.1, 22 pages, Apr. 12, 1993.

"Conversion of 10-bit Log Film Data to 8-bit Linear or Video Data for the Cineon Digital Film System" www.cineon/dfc/imageDocs/conversions.ps, Version 2.1, 18 pages, Jul. 26, 1995.

"Using LAD to Set UP an Electronic Color Analyzer and Printing Control" Entertainment Imaging, Eastman Kodak Company, 2 pages, 1992.

"A Simplified Motion-Picture Laboratory Control Method for Improved Color Duplication", SMPTE Journal, vol. 85, No. 10, pages 781-786, Oct. 1976.

* cited by examiner

TUNING CELL SIZES IN INTERPOLATED LOOKUP TABLES

BACKGROUND

Many devices represent colors of image elements to users for a variety of purposes. These purposes may typically include representing colors of image elements by a device on a display and/or in print. When a given device represents colors to a user, the device typically employs a color space to define each displayed and/or printed color numerically. The color space of a given device defines the total range of colors reproducible by that device. Typically, the color space of a given device does not encompass all possible colors and is therefore only a subset of all possible colors. As the color space of a given device is typically only a subset of all possible colors, different types of devices, different device models, and/or different manufactures may use varying color spaces.

A given color may be specified or represented in the form of one or more color components, which may be thought of as dimensions in a color space. Each color component may have a numerical color component value and together the color component values may provide information to generate a desired color on an output device. A color space may define the interpretation of the color component values used to represent a color. Examples of color spaces are RGB (Red, Green and Blue) and CMYK (Cyan, Magenta, Yellow and Black). For many color spaces, a color may be represented by one to four numbers, one for each dimension or component of the color space.

Different output devices often use different color spaces to represent colors, often resulting in the conversion of colors between different color spaces. It may be challenging to accurately represent each displayed and/or printed color numerically as color data in the device color space, so that the colors appear accurate to the eye of a user. For example, the transfer of color data from one device color space to another device color space may result in inaccurate color representation if the color spaces of the devices are not the same.

Color management often may be used to facilitate the transfer of color data from one device color space to another different device color space. Color management may typically be performed via a color management system (CMS), which may be used to reduce or eliminate color space matching problems and makes color portable. A CMS may reconcile the different color capabilities of scanners, monitors, and/or printers to ensure consistent color throughout the transfer of color data between various devices. For example, the colors displayed on a monitor may be accurately transferred to a printer. Similarly, color management may permit different applications, devices, and/or operating systems to display colors consistently.

A frequently used method in color management for converting color component values from a source color space to a destination color space may include the use of a multidimensional color lookup table. The color lookup table may contain a set of reference colors in the source color space, and corresponding mappings to reference colors in the destination color space. For example, if the source color space is L*a*b* (luminance, red/blue chrominance and yellow/blue chrominance) and the destination color space is CMYK (Cyan, Magenta, Yellow and Black), a CMYK output color values corresponding to an L*a*b* input color values may be obtained by looking up the L*a*b* input color value in an L*a*b* to CMYK lookup table.

In some cases, the reference colors in a color lookup table may not include all possible input colors. The output color values for input color values that are not reference colors may often be obtained by interpolating among the existing reference colors in the various lookup table dimensions. During the interpolation process the output color values for input color values that are not reference colors may be estimated based on known reference colors in the color lookup table.

Input shaper curves may be applied to input color values prior to the color lookup table. These input shaper curves may be used to linearize device characteristics such as dot gain. In some cases, fixed S-shaped shaper curves may be applied to the "a" and "b" channels in L*a*b* to CMYK conversions.

DESCRIPTION OF THE DRAWING FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description when read with the accompanying drawings in which:

Figure 1:
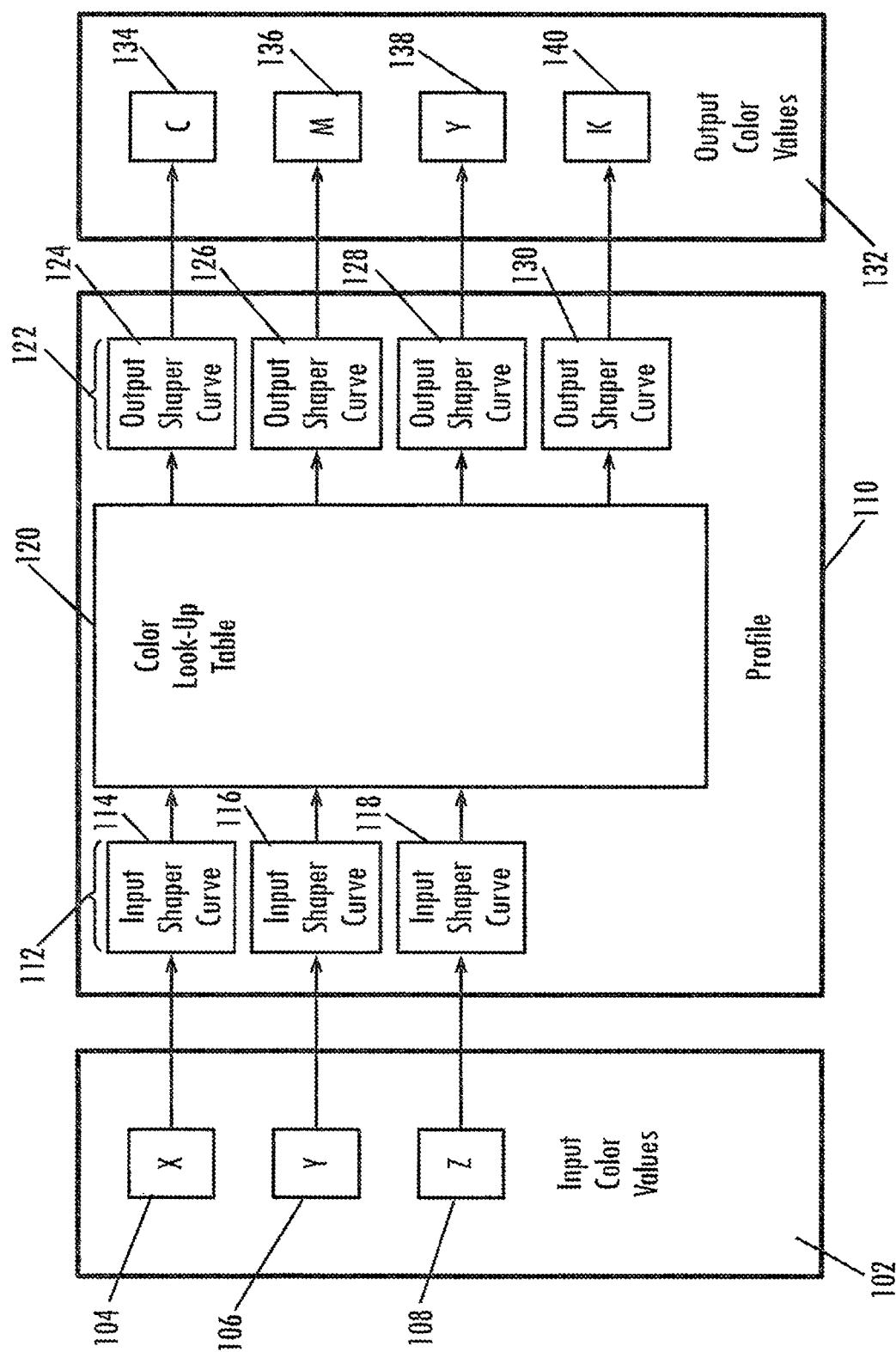
FIG. 1 is a schematic diagram illustrating a translation of data from input color values to output color values.

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and the scope of claimed subject matter defined by the appended claims and their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Embodiments claimed may include one or more apparatuses for performing the operations herein. These apparatuses may be specially constructed for the desired purposes, or they may comprise a general purpose computing platform selectively activated and/or reconfigured by a program stored in the device. The processes and/or displays presented herein are not inherently related to any particular computing platform and/or other apparatus. Various general purpose computing platforms may be used with programs in accordance with the teachings herein, or it may prove convenient to construct a more specialized computing platform to perform the desired method. The desired structure for a variety of these computing platforms will appear from the description below.

Embodiments claimed may include algorithms, programs and/or symbolic representations of operations on data bits or binary digital signals within a computer memory capable of performing one or more of the operations described herein. Although the scope of claimed subject matter is not limited in this respect, one embodiment may be in hardware, such as implemented to operate on a device or combination of devices, whereas another embodiment may be in software. Likewise, an embodiment may be implemented in firmware, or as any combination of hardware, software, and/or firmware, for example. These algorithmic descriptions and/or representations may include techniques used in the data processing arts to transfer the arrangement of a computing platform, such as a computer, a computing system, an electronic computing device, and/or other information handling system, to operate according to such programs, algorithms, and/or symbolic representations of operations. A program and/or process generally may be considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities. In addition, embodiments are not described with reference to any particular programming language. It will be appreciated that a variety of programming languages may be used to implement the teachings described herein.

Likewise, although the scope of claimed subject matter is not limited in this respect, one embodiment may comprise one or more articles, such as a storage medium or storage media. This storage media may have stored thereon instructions that when executed by a computing platform, such as a computer, a computing system, an electronic computing device, and/or other information handling system, for example, may result in an embodiment of a method in accordance with claimed subject matter being executed, for example. The terms "storage medium" and/or "storage media" as referred to herein relate to media capable of maintaining expressions which are perceivable by one or more machines. For example, a storage medium may comprise one or more storage devices for storing machine-readable instructions and/or information. Such storage devices may comprise any one of several media types including, but not limited to, any type of magnetic storage media, optical storage media, semiconductor storage media, disks, floppy disks, optical disks, CD-ROMs, magnetic-optical disks, read-only memories (ROMs), random access memories (RAMs), electrically programmable read-only memories (EPROMs), electrically erasable and/or programmable read-only memories (EEPROMs), flash memory, magnetic and/or optical cards, and/or any other type of media suitable for storing electronic instructions, and/or capable of being coupled to a system bus for a computing platform. However, these are merely examples of a storage medium, and the scope of claimed subject matter is not limited in this respect.

The term "instructions" as referred to herein relates to expressions which represent one or more logical operations. For example, instructions may be machine-readable by being interpretable by a machine for executing one or more operations on one or more data objects. However, this is merely an example of instructions, and the scope of claimed subject matter is not limited in this respect. In another example, instructions as referred to herein may relate to encoded commands which are executable by a processor having a command set that includes the encoded commands. Such an instruction may be encoded in the form of a machine language understood by the processor. However, these are merely examples of an instruction, and the scope of claimed subject matter is not limited in this respect.

Unless specifically stated otherwise, as apparent from the following discussion, it is appreciated that throughout this specification discussions utilizing terms such as processing, computing, calculating, selecting, forming, enabling, inhibiting, identifying, initiating, receiving, transmitting, determining, displaying, sorting, applying, varying, delivering, appending, making, presenting, distorting and/or the like refer to the actions and/or processes that may be performed by a computing platform, such as a computer, a computing system, an electronic computing device, and/or other information handling system, that manipulates and/or transforms data represented as physical electronic and/or magnetic quantities and/or other physical quantities within the computing platform's processors, memories, registers, and/or other information storage, transmission, reception and/or display devices. Further, unless specifically stated otherwise, processes described herein, with reference to flow diagrams or otherwise, may also be executed and/or controlled, in whole or in part, by such a computing platform.

Reference throughout this specification to "one embodiment" or "an embodiment" means that a particular feature, structure, or characteristic described in connection with the embodiment is included in at least one embodiment of claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

As will be described in greater detail below, in one particular example, although claimed subject matter is not limited in this respect, a weighted input shaper curve may be determined for one or more channels of input color values. The weighted input shaper curves may be determined so as to reduce the interpolation errors in a prospective multi-dimensional color lookup table. For example, an initial mapping of input color values may be performed to determine an interpolation result by applying an initial input shaper curve to a color lookup table. The initial mapping of input color values may comprise applying the input color values to a known initial input shaper curve. For example, the known initial input shaper curve may comprise an S-curve, a dot gain curve, or other known shaper curves. The initial mapping of input color values may further comprise applying the known initial input shaper curves to the color lookup table to supply an interpolation result. The term "interpolation" as referred to herein relates to using a process of determining one or more estimated values based at least in part on one or more known values. The term "interpolation result" as referred to herein relates to determining one or more estimated values through an interpolation based at least in part on an input shaper curve applied to a color lookup table. An assessment of accuracy of the interpolation result may be performed. In one particular example, such an assessment of accuracy of the interpolation result may include a comparison with a reference representation that may have increased accuracy as compared to the prospective color lookup table. For example, the interpolation error may be quantified as a calculated interpolation error between one or more intervals in a prospective color lookup table as compared to a reference representation. Based at least in part on the calculated interpolation error, a weighted input shaper curve or weighted color lookup table may be formed. As is illustrated below, the weighted input shaper curve or weighted color lookup table may increase interpolation accuracy and/or interpolation speed as compared to the known initial input shaper curve and/or the prospective color lookup table.

Referring to FIG. 1, a schematic diagram illustrates a translation of data from input color values to output color values in accordance with one or more embodiments. The terms "input dolor values" and/or "output color values" as referred to herein relate to information that is organized and/or formatted in a digitized form for printing or for displaying in a graphical user interface. For example, "input color values" and/or "output color values" may be organized and/or formatted in a digitized form comprising one or more of the following formats: jpeg, tiff, pdf, psd, and/or the like, or combinations thereof. However, these are merely example formats, and the scope of claimed subject matter is not limited in this respect.

Input color values 102 may include input color values for multiple color channels. For example, if the input color values 102 are expressed in CIE XYZ (International Commission on Illumination XYZ) source color space, the input color values 102 may include an X-channel 104, a Y-channel 106, and a Z-channel 108. Alternatively, if the source color space is L*a*b* (luminance, red/blue chrominance and yellow/blue chrominance) the input color values 102 may include an L-channel, an a-channel, and a b-channel. Other examples of color channels for the input color values 102 may include RGB (Red, Green, and Blue), CMYK (Cyan, Magenta, Yellow and Black), and/or the like.

The term "color managed" as referred to herein relates to the management of the transfer of input color values 102 from a source color space to a destination color space in a color conversion process. For example, the color space of a given device may define a total range of colors reproducible by that device. Typically, the color space of a given device does not encompass all possible colors and is therefore only a subset of all possible colors. As the color space of a given device is typically only a subset of all possible colors, different types of devices (such as printers, displays, scanners, or the like), different device models, and/or different manufactures may use varying color spaces. For example, color management may translate input color values 102 from a source color space to a different destination color space. Color spaces may include but are not limited to the following: sRGB, Adobe RGB and Adobe Wide Gamut RGB, CMYK, CIE 1931 XYZ, CIELUV, CIELAB, CIE 1964, or the like. A device independent color space may provide a device independent reference for transferring input color values 102 from a source device profile to a different destination device profile.

Device profile 110 may define the color characteristics of a given device to allow for a translation of input color values 102 from a device independent color space into a destination device color space. Alternatively, it is not required to convert input color values 102 to and from an intermediate color space. For example, a translation between a source device color space into a destination device color space may instead be accomplished by combining the transforms into one. However, these are merely examples of translations between color spaces, and the scope of claimed subject matter is not limited in this respect.

Input shaper curves 112 may be included in device profile 110 for use in a color conversion. Individual input shaper curves 112 may be assigned to one or more of the channels for input color values 104, 106, and/or 108. For example, if the input color values 102 are expressed in CIE XYZ source color space (as illustrated), the input shaper curves 112 may include an X-channel input shaper curve 114, a Y-channel input shaper curve 116; and a Z-channel input shaper curve 118. Alternatively, if the source color space is L*a*b* (luminance, red/blue chrominance and yellow/blue chrominance) the input color values 102 may include an L-channel input shaper curve, an a-channel input shaper curve, and/or a b-channel input shaper curve.

Input color values 102 may be applied to input shaper curves 112 prior to the color lookup table 120. Input shaper curves 112 may operate to linearize device characteristics such as dot gain. Additionally, as will be discussed in more detail below, input shaper curves 112 may operate to decrease interpolation errors, enhancing the ability to create color lookup tables 120 having decreased size. Alternatively or additionally, input shaper curves 112 may operate to decrease interpolation errors, enhancing the ability to create color lookup tables 120 having increased accuracy Color lookup table 120 may be included in device profile 110 for use in a color conversion. The term "color lookup tables" as referred to herein relates to an array associating color component values of a source color space to color component values of a destination color space. The term "array" as used herein may comprise a format for arranging and/or organizing data, such as for example, a multi-dimensional table, a multi-dimensional matrix, and/or the like. Color lookup table 120 may contain a set of reference colors in the source color space, and corresponding mappings to reference colors in the destination color space. For example, if the source color space is L*a*b* (luminance, red/blue chrominance and yellow/blue chrominance) and the destination color space is CMYK (Cyan, Magenta, Yellow and Black), a CMYK output color value corresponding to an L*a*b* input color value may be obtained by looking up the L*a*b* input color value in an L*a*b* to CMYK color lookup table. A CMYK-RGB (Red, Green, and Blue) conversion may include a 4-dimensional color lookup table that may include 11×11×11×11 table entries, with each table entry including 3 color values. Similarly, a RGB-CMYK conversion may include a 3-dimensional color lookup table that may include 33×33×33 table entries, with each table entry including 4 color values.

For example, the table entries of a color lookup table may comprise a plurality of discrete known color values. Discrete known color values may be set out in a grid pattern within color lookup table 120. Within the grid pattern, the discrete known color values may comprise grid points spaced apart from one another at discrete grid intervals. As noted above, color lookup table 120 may be utilized to associate input color values of a source color space to output color values of a destination color space. For example, input color values may be mapped to corresponding coordinates located within the grid pattern of color lookup table 120. In some cases, coordinates mapped from input color values may correspond directly to grid points located within color lookup table 120. As the grid points located within color lookup table 120 may be associated with known color values, the input color values may be converted to output color values based on the known color values without interpolation. In other cases, coordinates mapped from input color values may not correspond directly to grid points located within color lookup table 120. Instead, the coordinates mapped from input color values may fall within the discrete grid intervals between the grid points within color lookup table 120. The input color values may then be converted to estimated output color values through interpolation based at least in part on the location of the mapped coordinates within the discrete grid intervals and/or on the discrete known color values of the grid points bounding the discrete intervals and/or adjacent to the mapped coordinates. Several interpolation methods may be available for interpolating estimated output color values from the discrete known color values of color lookup table 120.

Linear interpolation is one interpolation method but may be computationally slower compared to other interpolation methods, so other methods which may be used. For three-dimensional tables, prism, pyramid, cubic and tetrahedral interpolation methods may be utilized, for example. For tables with four or more dimensions other higher order interpolation methods may be utilized. The various interpolation methods may offer different balances between computational speed and accuracy. For example, cubic interpolation methods may examine a larger number of table entries but be computationally slower as compared to faster hedral methods that may examine a smaller number of table entries:

Additionally, during interpolation, there may be a trade off between the size of the color lookup table 120 and the accuracy of the interpolated result of output color values. For example, a larger color lookup table 120 may increase the accuracy of the interpolated result; however, a larger color lookup table 120 may be computationally slower compared to tables of smaller size. For smooth color space transfer functions, interpolation may be an effective way to reduce the size of a particular color lookup table. However, for color space transfer functions that are not smooth, a higher level of accuracy in the interpolation may not be available without a color lookup table 120 of larger size. However, color lookup tables of larger size may degrade performance both when created and when used due to increased file sizes.

Additionally or alternatively, output shaper curves 122 may be included in device profile 110 for use in color conversion. Individual output shaper curves 122 may be assigned to one or more of the channels for output color values 132. For example, if the output color values 132 are expressed in CMYK destination color space (as illustrated), the output shaper curves 122 may include an C-channel output shaper curve 124, a M-channel output shaper curve 126, a Y-channel output shaper curve 128, and a K-channel output shaper curve 130. Output shaper curves 122 may be applied to the interpolation result. Output shaper curves 122 may operate to modify the characteristics of the individual C-channel output shaper values 134, M-channel output values 136, Y-channel output values 138, and K-channel output values 140 of output color values 132.

Figure 2:
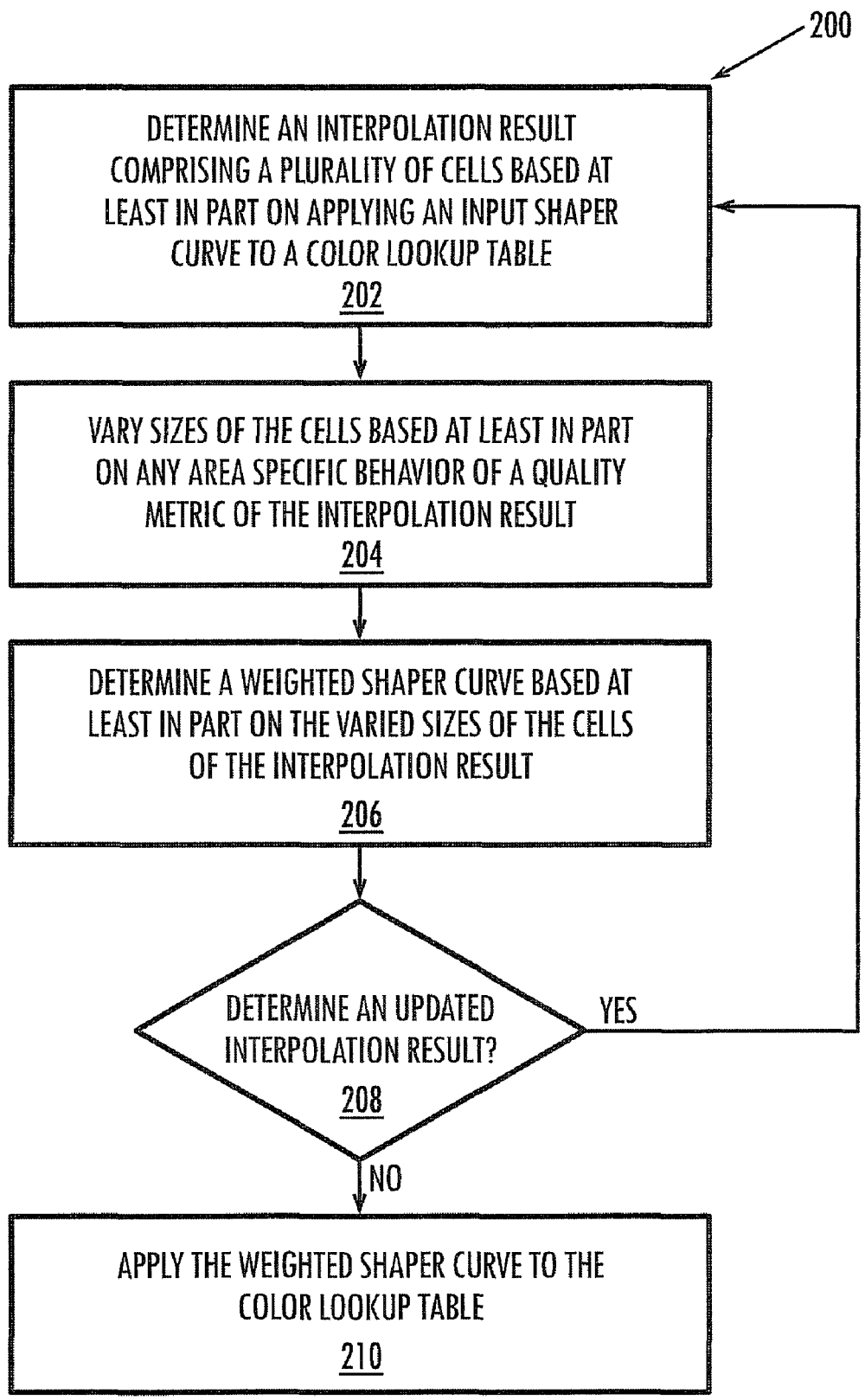
FIG. 2 is a flow diagram illustrating a procedure for varying sizes of cells of an interpolation result based at least in part on an area specific behavior of a quality metric in accordance with one or more embodiments.

Referring to FIG. 2, a flow diagram illustrates an example procedure in accordance with one or more embodiments, although the scope of claimed subject matter is not limited in this respect. Procedure 200 illustrated in FIG. 2 may be used to vary sizes of the cells of an interpolation result based at least in part on an area specific behavior of a quality metric in accordance with one or more embodiments, for example, although the scope of claimed subject matter is not limited in this respect. Additionally, although procedure 200, as shown in FIG. 2, comprises one particular order of blocks, the order in which the blocks are presented does not necessarily limit claimed subject matter to any particular order. Likewise, intervening blocks shown in FIG. 2 and/or additional blocks not shown in FIG. 2 may be employed and/or blocks shown in FIG. 2 may be eliminated, without departing from the scope of claimed subject matter.

Procedure 200 depicted in FIG. 2 may in alternative embodiments be implemented in software, hardware, and/or firmware, and may comprise discrete operations. As illustrated, procedure 200 starts at block 202 where an interpolation result may be determined. For example, the interpolation result may comprise a plurality of cells based at least in part on applying one or more input shaper curves 112 to a color lookup table 120. In one embodiment, the interpolation result may be obtained by an application of one or more input shaper curves 112 to color lookup table 120 based at least in part on reference data to supply an interpolation result.

In one particular example, although claimed subject matter is not limited in this respect, initial input curves 112 may be set up based at least in part on a known input shaper curve. For example, the known input shaper curve may comprise an S-curve, a dot gain curve, or other known shaper curves. Reference data comprising input color values 102 may be linearly mapped grid points of initial input shaper curves 112, such as is illustrated for example in the following relation:

$$(in,out)[i]=((i-1)/(n-1),(i-1)/(n-1))$$

An error of an interpolation result may be gathered, as will be described in greater detail below. For example, a maximum error may be gathered for each channel and for each discrete grid interval between the grid points of color lookup table 120. An initial interpolation function may be determined based at least in part on initial input shaper curves 112 and color lookup table 120. For example, color lookup table 120 may have n grid points per dimension; however, the grid points need not be same n for all dimensions. The interpolation function may be defined, such as is illustrated for example in the following relation:

$$f(r,g,b)=3DLUT\text{interpolation}(\text{curve}[1](r),\text{curve}[2](g),\text{curve}[3](b))$$

In the above interpolation function relation, curve[i](x) (initial input shaper curves 112) may be interpolated from a sampled curve. Further the 3DLUT (three dimensional color lookup table 120) may be populated, such as is illustrated for example in the following relation:

$$3DLUT[i,j,k]=\text{reference result for } [i,j,k]=\text{reference-Function}(\text{curve}[1]^{-1}((i-1)/(n-1)),\text{curve}[2]^{-1}((j-1)/(n-1)),\text{curve}[3]^{-1}((k-1)/(n-1)))$$

For the above calculations linear interpolation may be used for any and/or all lookup tables. The method as described below may utilize such a 3DLUT to calculate a set of interpolation errors. However, other methods may be used to calculate interpolation errors, such as for example, a parallel processing of grid points located within color lookup table 120.

One or more error vectors, each with n−1 errors may be calculated, as will be describe in greater detail below. For example, one error vector, with n−1 errors may be calculated for each input channel. Alternatively, one common error vector with n−1 errors may be calculated where one common input shaper curve is associated with each input channel. An initial interpolation function may be sampled for several input channel values (such as 3-5 values, for example) spread within each grid interval. For example, a selected discrete grid interval between the grid points of color lookup table 120 may be associated with an error vector for a selected input channel; additionally, the non-selected input channels may be sampled across their full ranges, so as to find a maximum error for the selected grid interval and the selected input channel. For example, such a sampling across the full ranges of non-selected input channels may be sparse in cases where spatial error characteristics change slowly across the grid intervals. Alternatively, in cases where the spatial error characteristics are known, such sampling may not need to sample the full ranges of non-selected input channels, but may obtain a maximum interpolation error by other processes. Further, the location of the mapped coordinates with respect to the grid points may be varied by the application of an offset value to the mapped coordinates. For example, the offset value may increase from an initial value of 0 to 0.5 over multiple iterations (such as 20 iterations, for example) to affect convergence. Based at least in part on the sampling described above, interpolation results may be calculated from an initial interpolation function. Likewise, reference results may be calculated based at least in part on application of the sampling described above to a reference representation. For example, the reference representation may comprise an analytical model, a high-resolution lookup table, and/or a table with a high-order interpolation method, or the like. Based at least in part on comparison between the interpolation results and the reference results, an error distance between reference results and interpolation results may be calculated. As is described below in more detail, this error distance may comprise one or more error vectors (such as one common error vector shared by all the input channels or one error vector per input channel, for example) and may be weighted as a function of the input coordinates to permit minimizing errors in important regions of the input color space.

At block 204, the sizes of the cells may be varied based at least in part on an area specific behavior of a quality metric of the interpolation result. As describe above, the interpolation result may be compared with a reference representation that may have increased accuracy as compared to color lookup table 120 to determine an area specific behavior of a quality metric. The term "quality metric" as referred to herein relates to a measurement capable of quantifying the accuracy of a mathematical model over any area. The term "area specific behavior" as referred to herein relates to an application of one or more quality metrics over one or more given areas, such as for example, a calculation of interpolation error for various areas of an interpolation result. For example, the interpolation error may be quantified as a calculated maximum interpolation error between one or more intervals in color lookup table 120 as compared to a reference representation. Accordingly, the interpolation error may be based at least in part on a comparison between the interpolation result and the reference representation.

Based at least in part on variations in the interpolation error across the interpolation result, a weighted shaper curve and/or a weighted color lookup table may be formed to address the non-uniform nature of the interpolation error. For example, an updated interpolation result may comprise a plurality of cells having varied sizes based at least in part on a weighted shaper curve and/or a weighted color lookup table. The term "cell" as referred to herein relates to a portion of a lookup table bounded by known values. For example, a multi-dimensional color lookup table may comprise one or more cells having an area defined by grid points of known color values in a grid pattern where corners of the cell may represent a destination color value. Additionally or alternatively, a one-dimensional shaper lookup table corresponding to a shaper curve may comprise one or more cells defined by a line segment bounded by two discrete values. The term "size" as referred to herein relates to the dimensions of the portion of a lookup table bounded by known values. For example, a weighted shaper curve and/or a weighted color lookup table may address the non-uniform nature of the interpolation error by varying sizes of cells of the interpolation result. By varying sizes of cells of the interpolation result the non-uniform nature of the interpolation error may be addressed by increasing sampling of the updated interpolation function in high error regions. Due to the increased sampling in high error regions, the local variations in the interpolation error across the interpolation result may be minimized.

At block 206, a weighted shaper curve may be determined based at least in part on the varied sizes of the cells of the interpolation result. Alternatively, a weighted color lookup table may be determined based at least in part on the varied sizes of the cells of the interpolation result. For example, as discussed above, a weighted input shaper curve may be determined for each channel of input color values based at least in part on an associated interpolation error by increasing sampling in high error regions of color lookup table 120. Additionally or alternatively, the weighted input lookup table may comprise a one dimensional weighted input lookup table associated with a single color channel of the color lookup table 120. The weighted input shaper curves may be determined so as to reduce the interpolation errors from use of color lookup table 120. For example, the one dimensional weighted input lookup table may comprise a single table axis. The table axis space of the one dimensional weighted input lookup table may be allocated to vary cell sizes of the one dimensional weighted input lookup table in proportion to the interpolation error. Accordingly, cell sizes of the one dimensional weighted input lookup table may be varied to increase sampling in high error regions of the interpolation result. For example, the weighted input lookup table may comprises one or more cells of reduced size associated with interpolation result areas of high interpolation error and one or more cells of increased size associated with interpolation result areas of low interpolation error. Accordingly, interpolation accuracy may be affected by application of the weighted input shaper curve to color lookup table 120.

In one particular example, although claimed subject matter is not limited in this respect, one or more weighted shaper curves may be calculated based at least in part on the one or more error vectors, each with n−1 errors, discussed above. For example, for each input channel, spacing values for the weighted shaper curve may be calculated from the error vector of that channel. First, the error vector may be smoothed by adding an amount, such as 0.01 for example, of adjacent error values to each individual error value. This operation to smooth the error vector may affect convergence for error vectors with increased sample-to-sample variations. Next, spacing values of the weighted shaper curve may be calculated from the error vector of that channel by defining a base error as equal to a given percent of either a maximum error or a standard deviation of the error, such as is illustrated for example in the following relation:

spacing=1/(error+base error)^gamma

Where the value of gamma from the above relation may depends on the interpolation method used. For example, gamma may equal ½ in instances where linear interpolation processes (including hedral, prism, etc) are utilized. Alternatively, gamma may equal ¼ in instances where cubic interpolation processes are utilized. Further, gamma may equal 1/K where K may be based on the number of points used in one dimension in the selected interpolation process.

This operation of defining a base error based at least in part on a maximum error or a standard deviation of the error may operate to affect convergence for error vectors. For example, a base error greater than 0 may operate to improve convergence. However, a base error may cause divergence in cases where the base error is too small in value, while a base error may cause a decrease in convergence speed in cases where the base error is too large in value. Useful base errors may comprise a base error of about 0.2 of a standard deviation of error in an error vector or a base error of about 0.4 of the maximum error in an error vector.

Spacing values for the weighted shaper curve may be accumulated in a vector and normalized so the maximum value is equal to 1.0, such as is illustrated for example in the following relations:

accum[1]=0 accum[i+1]=sum of spacing [1 to i], for i=1 ... n−1 accum=accum/accum[n] (normalize to 1.0)

An intermediate sampled shaper curve may be created that may map the accumulated spacing values to grid points of the initial input shaper curve 112, such as is illustrated for example in the following relation:

sampledC=n pairs of (in,out) values (accum[i],(i−1)/(n−1)) for i=1 ... n

A weighted shaper curve may be calculated based at least in part on the intermediate sampled shaper curve, described above, so that the weighted shaper curve incorporates sample points mapped to lookup table grid points. For example, the initial input shaper curve may be concatenated with the intermediate sampled shaper curve, such as is illustrated for example in the following relation:

newC(x)=sampledC(oldC(x))

Here, the newC (weighted shaper curve) may be expressed as a sampled function or curve, with n pairs of (in, out) point values, such as is illustrated for example in the following relation:

(in,out)[i]=(newC⁻¹((i−1)/(n−1)),(i−1)/(n−1))

In the relation noted above, such out point values may be spaced equidistantly, so that such out point values may be mapped exactly to look up table grid points. Additionally, after a newC (weighted shaper curve) is calculated, the 3DLUT described at paragraph [0040] may be obsolete and may be discarded or recalculated using an updated newC.

At block 208, an updated interpolation result may be determined. For example, interpolation result may be updated based at least in part on applying the weighted shaper curve if the interpolation error has not been reduced to a desired level. If an updated interpolation result is to be determined, the process may repeat block 204 with the weighted shaper curve by varying sizes of the cells of the updated interpolation result based at least in part on an area specific behavior of a quality metric of the interpolation result and may then repeat block 206 by determining an updated weighted shaper curve based at least in part on the varied sizes of the cells of the updated interpolation result.

In one particular example, although claimed subject matter is not limited in this respect, an updated interpolation result may be determined until errors are near equal in all intervals. For example an updated interpolation result may be determined until errors comprise a Max (StandardDeviation/Mean for each channel) less than 0.01. Additionally or alternatively, an updated interpolation result may be determined until a maximum number of iterations are reached, such as 20 iterations, for example.

At block 210, the weighted shaper curve may be applied to the color lookup table 120. Additionally or alternatively, the weighted shaper curve may be incorporated into color lookup table 120 to form a weighted color lookup table. Accordingly, input color values 102 may be applied to weighted shaper curve and/or weighted color lookup table to determine output color values 132 through a color conversion process.

In operation, the above process may operate to minimize interpolation errors by tuning input shaper curves. For example, the above process may operate to reduce interpolation errors and/or reduce the size of color lookup table 120 for functions that exhibit high interpolation errors when using linear interpolation, such as functions having non-zero third derivatives, for example. In operation, the above process may operate to reduce errors by as much as or more than a factor of ten, or sizes of color lookup table 120 may be reduced by as much as or more than a factor of three in each dimension for functions that exhibit high interpolation errors. Additionally or alternatively, the above process or similar process may be used outside color management, such as for example, in graphic processing unit (GPU) texture interpolation.

Figure 3:
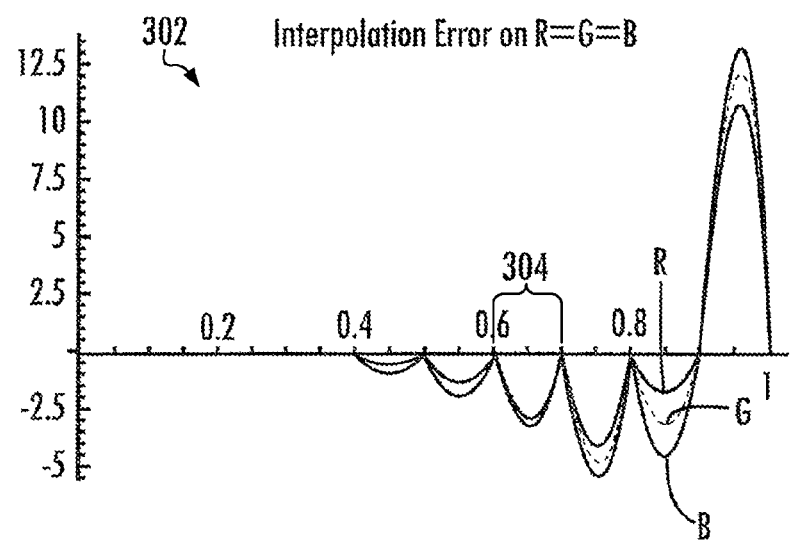
FIG. 3 is a graphic diagram illustrating an initial cell size distribution of a one dimensional input lookup table associated with an initial error distribution.
Figure 4:
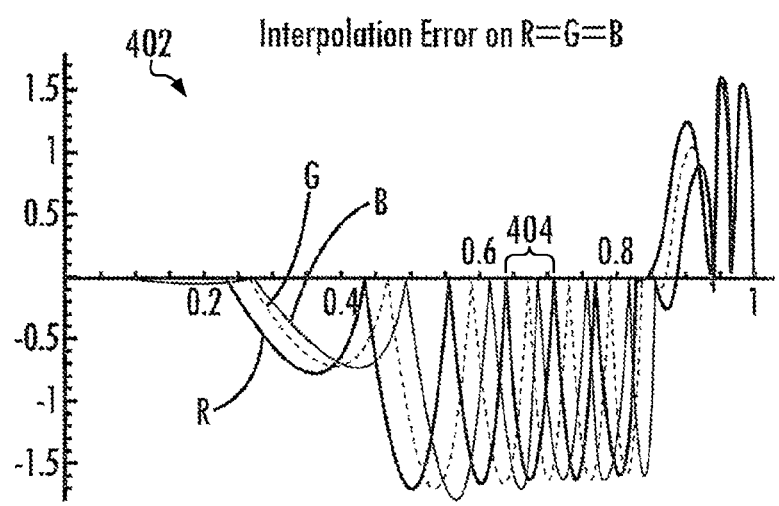
FIG. 4 is a graphic diagram illustrating an updated cell size distribution of a one dimensional weighted input lookup table associated with an updated error distribution.
Figure 5:
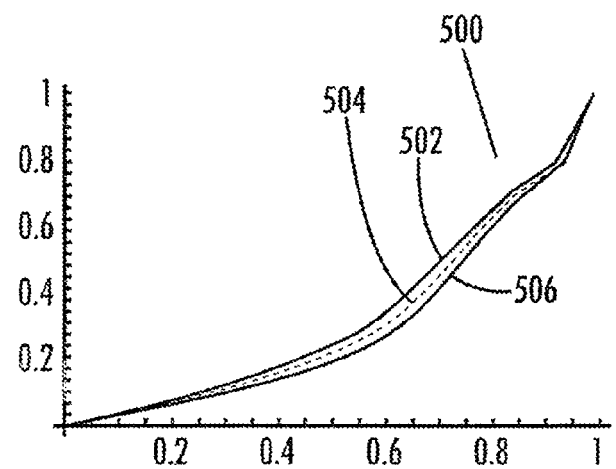
FIG. 5 is a graphic diagram illustrating various weighted input shaper curves in accordance with one or more embodiments.

Referring to FIG. 3, an example of an initial error distribution 302 for a prospective color lookup table 120 is illustrated. As shown, the initial error distribution 302 for color values, such as for example, red color values, green color values, and/or blue color values, are non-uniform, having an error spike at the right hand portion of initial error distribution 302 curve. An initial cell size distribution 304 of a one dimensional input lookup table may be associated with such an initial error distribution 302. As shown, initial cell size distribution 304 may be uniformly distributed regardless of such a high error region at the right hand portion of initial error distribution 302 curve. Conversely, referring to FIG. 4, an example of an updated error distribution 402 for a weighted color lookup table is illustrated where the error distribution has been minimized using the process described above. An updated cell size distribution 404 of a one dimensional weighted input lookup table may be associated with such an updated error distribution 402. As shown, updated cell size distribution 404, may be non-uniformly distributed, comprising cells of reduces size associate with such a high error region at the right hand portion of the updated error distribution 402 curve. As described above, cell sizes of the one dimensional weighted input lookup table may be varied to increase sampling in high error regions of the interpolation result. For example, the weighted input lookup table may comprises one or more cells of reduced size associated with interpolation result areas of high interpolation error and one or more cells of increased size associated with interpolation result areas of low interpolation error. As shown in FIG. 4, the error spikes (illustrated in FIG. 3) have been minimized and error distribution for the color values are near uniform in nature. Referring to FIG. 5, an example of an initial input shaper curve 500 compared with a red weighted input shaper curve 502, a green weighted input shaper curve 504, and a blue weighted input shaper curve 506 is illustrated where the error distribution has been minimized using the process described above.

Figure 6:
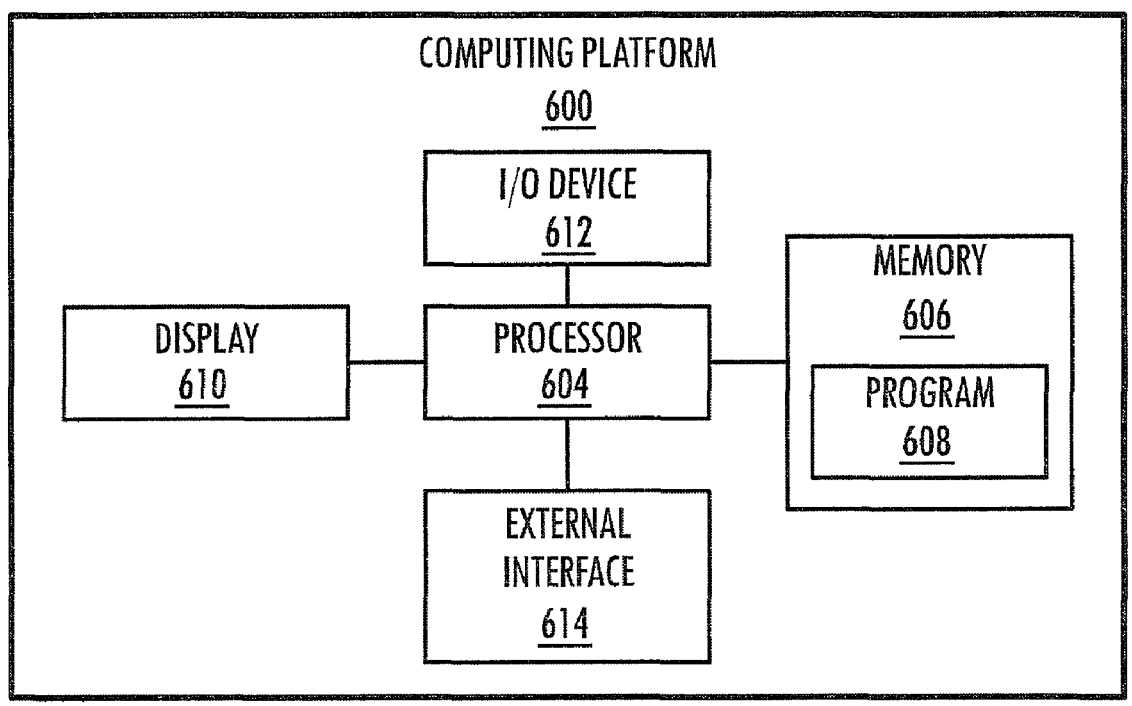
FIG. 6 is a schematic diagram of a computing platform in accordance with one or more embodiments.

Referring to FIG. 6, a block diagram illustrates a computing platform 600 according to one or more embodiments, although the scope of claimed subject matter is not limited in this respect. Computing platform 600 may include more and/or fewer components than those shown in FIG. 6. However, generally conventional components may not be shown, for example, a battery, a bus, and so on.

Computing platform 600, as shown in FIG. 6 may be utilized to tangibly embody a computer program and/or graphical user interface by providing hardware components on which the computer program and/or graphical user interface may be executed. Computing platform 600 may be utilized to tangibly embody all or a portion of procedure 200 of FIG. 2. Such a procedure, computer program and/or machine readable instructions may be tangibly stored on a computer and/or machine readable storage medium such as a compact disk (CD), digital versatile disk (DVD), flash memory device, hard disk drive (HDD), and so on. As shown in FIG. 6, computing platform 600 may be controlled by processor 604, including one or more auxiliary processors (not shown). Processor 604 may comprise a central processing unit such as a microprocessor or microcontroller for executing programs, performing data manipulations, and controlling the tasks of computing platform 600. Auxiliary processors may manage input/output, perform floating point mathematical operations, manage digital signals, perform fast execution of signal processing algorithms, operate as a back-end processor and/or a slave-type processor subordinate to processor 604, operate as an additional microprocessor and/or controller for dual and/or multiple processor systems, and/or operate as a coprocessor and/or additional processor. Such auxiliary processors may be discrete processors and/or may be arranged in the same package as processor 604, for example, in a multicore and/or multithreaded processor; however, the scope of claimed subject matter is not limited in these respects.

Communication with processor 604 may be implemented via a bus (not shown) for transferring information among the components of computing platform 600. A bus may include a data channel for facilitating information transfer between storage and other peripheral components of computing platform 600. A bus further may provide a set of signals utilized for communication with processor 604, including, for example, a data bus, an address bus, and/or a control bus. A bus may comprise any bus architecture according to promulgated standards, for example, industry standard architecture (ISA), extended industry standard architecture (EISA), micro channel architecture (MCA), Video Electronics Standards Association local bus (VLB), peripheral component interconnect (PCI) local bus, PCI express (PCIe), hyper transport (HT), standards promulgated by the Institute of Electrical and Electronics Engineers (IEEE) including IEEE 488 general-purpose interface bus (GPIB), IEEE 696/S-100, and so on, although the scope of claimed subject matter is not limited in this respect.

Other components of computing platform 600 may include, for example, memory 606, including one or more auxiliary memories (not shown). Memory 606 may provide storage of instructions and data for one or more programs 608 to be executed by processor 604, such as all or a portion of procedure 200 of FIG. 2, for example. Memory 606 may be, for example, semiconductor-based memory such as dynamic random access memory (DRAM) and/or static random access memory (SRAM), and/or the like. Other semi-conductor-based memory types may include, for example, synchronous dynamic random access memory (SDRAM), Rambus dynamic random access memory (RDRAM), ferroelectric random access memory (FRAM), and so on. Alternatively or additionally, memory 606 may be, for example, magnetic-based memory, such as a magnetic disc memory, a magnetic tape memory, and/or the like; an optical-based memory, such as a compact disc read write memory, and/or the like; a magneto-optical-based memory, such as a memory formed of ferromagnetic material read by a laser, and/or the like; a phase-change-based memory such as phase change memory (PRAM), and/or the like; a holographic-based memory such as rewritable holographic storage utilizing the photorefractive effect in crystals, and/or the like; and/or a molecular-based memory such as polymer-based memories, and/or the like. Auxiliary memories may be utilized to store instructions and/or data that are to be loaded into memory 606 before execution. Auxiliary memories may include semiconductor based memory such as read-only memory (ROM), programmable read-only memory (PROM), erasable programmable read-only memory (EPROM), electrically erasable read-only memory (EEPROM), and/or flash memory, and/or any block oriented memory similar to EEPROM. Auxiliary memories also may include any type of non-semiconductor-based memories, including, but not limited to, magnetic tape, drum, floppy disk, hard disk, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), and so on. Other varieties of memory devices are contemplated as well.

Computing platform 600 further may include a display 610. Display 610 may comprise a video display adapter having components, including, for example, video memory, a buffer, and/or a graphics engine. Such video memory may be, for example, video random access memory (VRAM), synchronous graphics random access memory (SGRAM), windows random access memory (WRAM), and/or the like. Display 610 may comprise a cathode ray-tube (CRT) type display such as a monitor and/or television, and/or may comprise an alternative type of display technology such as a projection type CRT type display, a liquid-crystal display (LCD) projector type display, an LCD type display, a light-emitting diode (LED) type display, a gas and/or plasma type display, an electroluminescent type display, a vacuum fluorescent type display, a cathodoluminescent and/or field emission type display, a plasma addressed liquid crystal (PALC) type display, a high gain emissive display (HGED) type display, and so forth.

Computing platform 600 further may include one or more I/O devices 612. I/O device 612 may comprise one or more I/O devices 612 such as a keyboard, mouse, trackball, touchpad, joystick, track stick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electroacoustic transducer, microphone, speaker, audio amplifier, and/or the like.

Computing platform 600 further may include an external interface 614. External interface 614 may comprise one or more controllers and/or adapters to prove interface functions between multiple I/O devices 612. For example, external interface 614 may comprise a serial port, parallel port, universal serial bus (USB) port, and IEEE 1394 serial bus port, infrared port, network adapter, printer adapter, radio-frequency (RF) communications adapter, universal asynchronous receiver-transmitter (UART) port, and/or the like, to interface between corresponding I/O devices 612.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method, comprising:
   performing by one or more computers each comprising a processor:
      determining an interpolation result comprising a plurality of cells based at least in part on applying an input shaper curve to a color lookup table, wherein each of the plurality of cells comprises an area bounded by grid points of known color values; and
      varying sizes of the cells based at least in part on an area specific behavior of a quality metric of the interpolation result.

2. The method of claim 1, further comprising determining a weighted color lookup table based at least in part on said varied sizes of the cells.

3. The method of claim 1, further comprising determining a weighted shaper curve based at least in part on said varied sizes of the cells.

4. The method of claim 3, further comprising determining a weighted lookup table based at least in part on the weighted shaper curve, wherein the weighted lookup table comprises one or more cells of different sizes, and wherein cells of lower size than other cells of the weighted lookup table are associated with interpolation result areas of a higher interpolation error than the interpolation error of other interpolation result areas and wherein cells of higher size than other cells of the weighted lookup table are associated with interpolation result areas of a lower interpolation error than the interpolation error of other interpolation result areas.

5. The method of claim 1, further comprising:
   determining a weighted shaper curve based at least in part on said varied sizes of the cells; and
   applying the weighted shaper curve to the color lookup table.

6. The method of claim 1, further comprising:
   determining a weighted shaper curve based at least in part on said varied sizes of the cells;
   determining an updated interpolation result comprising a plurality of cells based at least in part on applying the weighted shaper curve to the color lookup table, wherein each of the plurality of cells of the updated interpolation result comprises an area bounded by grid points of known color values;
   varying sizes of the cells of the updated interpolation result based at least in part on an area specific behavior of a quality metric of the interpolation result; and
   determining an updated weighted shaper curve based at least in part on said varied sizes of the cells of the updated interpolation result.

7. The method of claim 1, further comprising:
   determining output color values through a color conversion process based at least in part on the color lookup table; and
   displaying and/or printing the output color values.

8. The method of claim 1, wherein the quality metric includes an interpolation error, and wherein the interpolation error is based at least in part on a comparison between the interpolation result and a reference representation.

9. The method of claim 1, wherein the quality metric includes an interpolation error, wherein the interpolation error is based at least in part on a comparison between the interpolation result and a reference representation, and wherein the reference representation comprises an analytical model, a high-resolution lookup table, and/or a table with a high-order interpolation method.

10. The method of claim 1, further comprising:
    determining one or more weighted shaper curves based at least in part on said varied sizes of the cells; and
    determining one or more weighted lookup tables based at least in part on the one or more weighted shaper curve, wherein the one or more weighted lookup tables comprise one or more one dimensional lookup tables each associated with a single color channel of the color lookup table.

11. An article, comprising:
    a non-transitory storage medium comprising machine-readable instructions stored thereon which, if executed by a computing platform, result in:
    determining an interpolation result comprising a plurality of cells based at least in part on applying an input shaper curve to a color lookup table, wherein each of the plurality of cells comprises an area bounded by grid points of known color values; and
    varying sizes of the cells based at least in part on an area specific behavior of a quality metric of the interpolation result.

12. The article of claim 11, wherein said machine-readable instructions, if executed by a computing platform, further result in determining a weighted color lookup table based at least in part on said varied sizes of the cells.

13. The article of claim 11, wherein said machine-readable instructions, if executed by a computing platform, further result in determining a weighted shaper curve based at least in part on said varied sizes of the cells.

14. The article of claim 13, wherein said machine-readable instructions, if executed by a computing platform, further result in: determining a weighted lookup table based at least in part on the weighted shaper curve, and wherein the weighted lookup table comprises one or more cells of different sizes, and wherein cells of lower size than other cells of the weighted lookup table are associated with interpolation result areas of a higher interpolation error than the interpolation error of other interpolation result areas and wherein cells of higher size than other cells of the weighted lookup table are associated with interpolation result areas of a lower interpolation error than the interpolation error of other interpolation result areas.

15. The article of claim 11, wherein said machine-readable instructions, if executed by a computing platform, further result in:
    determining a weighted shaper curve based at least in part on said varied sizes of the cells; and applying the weighted shaper curve to the color lookup table.

16. The article of claim 11, wherein said machine-readable instructions, if executed by a computing platform, further result in:
  determining a weighted shaper curve based at least in part on said varied sizes of the cells;
  determining an updated interpolation result comprising a plurality of cells based at least in part on applying the weighted shaper curve to the color lookup table, wherein each of the plurality of cells of the updated interpolation result comprises an area bounded by grid points of known color values;
  varying sizes of the cells of the updated interpolation result based at least in part on an area specific behavior of a quality metric of the interpolation result; and
  determining an updated weighted shaper curve based at least in part on said varied sizes of the cells of the updated interpolation result.

17. The article of claim 11, wherein said machine-readable instructions, if executed by a computing platform, further result in:
  determining output color values through a color conversion process based at least in part on the color lookup table; and
  displaying and/or printing the output color values.

18. The article of claim 11, wherein the quality metric includes an interpolation error, and wherein the interpolation error is based at least in part on a comparison between the interpolation result and a reference representation.

19. The article of claim 11, wherein the quality metric includes an interpolation error, wherein the interpolation error is based at least in part on a comparison between the interpolation result and a reference representation, and wherein the reference representation comprises an analytical model, a high-resolution lookup table, and/or a table with a high-order interpolation method.

20. The article of claim 11, wherein said machine-readable instructions, if executed by a computing platform, further result in:
  determining one or more weighted shaper curves based at least in part on said varied sizes of the cells; and
  determining one or more weighted lookup tables based at least in part on the one or more weighted shaper curve, wherein the one or more weighted lookup tables comprise one or more one dimensional lookup tables each associated with a single color channel of the color lookup table.

21. An apparatus, comprising:
  means for determining an interpolation result comprising a plurality of cells based at least in part on applying an input shaper curve to a color lookup table, wherein each of the plurality of cells comprises an area bounded by grid points of known color values; and
  means for varying sizes of the cells based at least in part on an area specific behavior of a quality metric of the interpolation result.

22. The apparatus of claim 21, further comprising means for determining a weighted color lookup table based at least in part on said varied sizes of the cells.

23. The apparatus of claim 21, further comprising:
  means for determining a weighted shaper curve based at least in part on said varied sizes of the cells;
  means for determining an updated interpolation result comprising a plurality of cells based at least in part on applying the weighted shaper curve to the color lookup table, wherein each of the plurality of cells of the updated interpolation result comprises an area bounded by grid points of known color values;
  means for varying sizes of the cells of the updated interpolation result based at least in part on an area specific behavior of a quality metric of the interpolation result; and
  means for determining an updated weighted shaper curve based at least in part on said varied sizes of the cells of the updated interpolation result.

24. An apparatus, comprising:
  a computing platform, said computing platform comprising:
    a processor system, said processor system being capable of:
      determining an interpolation result comprising a plurality of cells based at least in part on applying an input shaper curve to a color lookup table, wherein each of the plurality of cells of comprises an area bounded by grid points of known color values; and
      varying sizes of the cells based at least in part on an area specific behavior of a quality metric of the interpolation result.

25. The apparatus of claim 24, wherein said processor system is further capable of: determining a weighted color lookup table based at least in part on said varied sizes of the cells of the interpolation result.

26. The apparatus of claim 24, wherein said processor system is further capable of: determining a weighted shaper curve based at least in part on said varied sizes of the cells of the interpolation result.

27. The apparatus of claim 26, wherein said processor system is further capable of: determining a weighted lookup table based at least in part on the weighted shaper curve, wherein the weighted lookup table comprises one or more cells of different sizes, and wherein cells of lower size than other cells of the weighted lookup table are associated with interpolation result areas of a higher interpolation error than the interpolation error of other interpolation result areas and wherein cells of higher size than other cells of the weighted lookup table are associated with interpolation result areas of a lower interpolation error than the interpolation error of other interpolation result areas.

28. The apparatus of claim 24, wherein said processor system is further capable of:
  determining a weighted shaper curve based at least in part on said varied sizes of the cells of the interpolation result;
  determining an updated interpolation result comprising a plurality of cells based at least in part on applying the weighted shaper curve to the color lookup table, wherein each of the plurality of cells of the updated interpolation result comprises an area bounded by grid points of known color values;
  varying sizes of the cells of the updated interpolation result based at least in part on an area specific behavior of a quality metric of the interpolation result; and
  determining an updated weighted shaper curve based at least in part on said varied sizes of the cells of the updated interpolation result.

29. The apparatus of claim 24; wherein the quality metric includes an interpolation error, wherein the interpolation error is based at least in part on a comparison between the interpolation result and a reference representation, and wherein the reference representation comprises an analytical model, a high-resolution lookup table, and/or a table with a high-order interpolation method.

* * * * *